P. J. STENSON.
WHEEL GRIP.
APPLICATION FILED JULY 6, 1910.
984,046.
Patented Feb. 14, 1911.
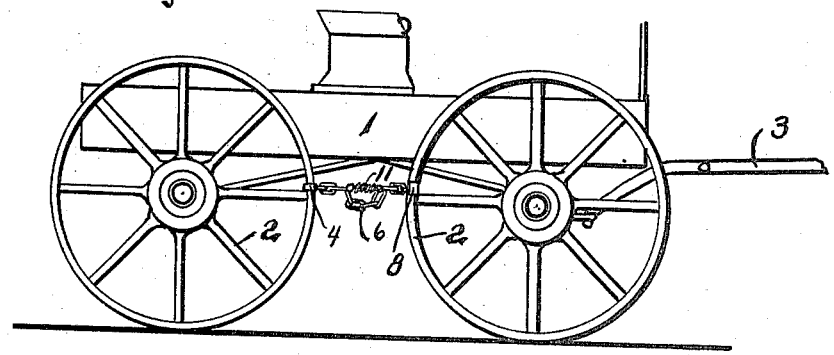
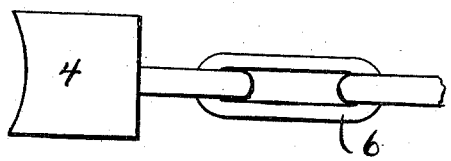
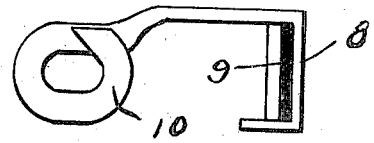
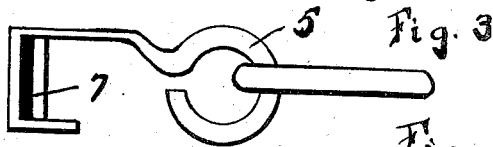
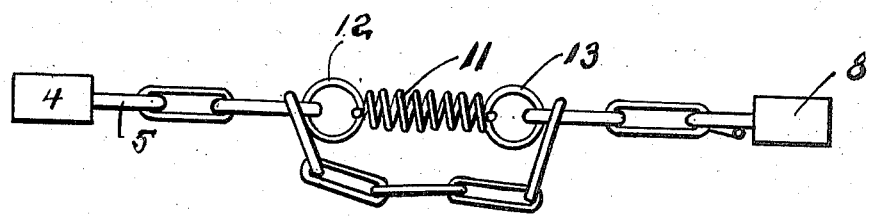
Witnesses.
Roswell P. Rogers.
E. R. Blake.
by,
Inventor.
P. J. Stenson.
Carlos P. Griffin
Atty.

UNITED STATES PATENT OFFICE.

PETER J. STENSON, OF SAN FRANCISCO, CALIFORNIA.

WHEEL-GRIP.

984,046.  Specification of Letters Patent.  Patented Feb. 14, 1911.

Application filed July 6, 1910. Serial No. 570,574.

*To all whom it may concern:*

Be it known that I, PETER J. STENSON, a subject of the King of England, residing at San Francisco, in the county of San Francisco and State of California, have invented a new and useful Wheel-Grip, of which the following is a specification in such full and clear terms as will enable those skilled in the art to construct and use the same.

This invention relates to a device for preventing runaways, and its object is to secure the wheels of a buggy or wagon together so that they can not be turned when a horse starts.

Another object of the invention is to provide means whereby the devise will be retained upon the wheel, even though the wheels move more or less before the horse starts.

The device consists of a pair of protected hooks to pass over the felly of each wheel and having a chain connecting them. The difficulty with this apparatus by itself is that when the wheels approach too close the hooks fall off the wheel easily, and the present invention seeks to hold it to the wheels at all times, even though the wheels approach each other.

In the drawings in which the same numeral of reference is applied to the same portion throughout the several views, Figure 1 is a side elevation of a wagon having the attachment placed thereon; Fig. 2 is a view of the hook which is fastened to the chain at one end thereof; Fig. 3 is a plan view of the same hook; Fig. 4 is a plan view of the hook used on the opposite end of the chain; and Fig. 5 is a view of the complete device.

The numeral 1 is applied to the wagon, 2 representing the wheels thereof, and 3 the shafts.

The numeral 4 represents one of the hooks used to pass over the felly, said hook having a ring 5 in which one of the links of the chain 6 is secured. This hook 4 is curved as shown in Fig. 2 to fit the curve of the wheel and it is provided with a rubber pad 7 on the interior thereof to prevent the marring of the varnish on the wheels. At the opposite end of the chain 6 there is a hook 8 having a rubber pad 9 thereon like the pad in the hook 4, and in order to make the device applicable to several sizes of wagons and buggies, this hook is provided with a spiral hook 10 which engages the chain and may be used in any one of the several links, while at the same time it prevents the chain from coming off readily. Near the center of the chain a spring 11 is placed, said spring having rings 13 and 12 connected with two of the links of the chain, and this spring is stiff enough to hold the hooks 8 and 4 tightly engaged with the wheels as shown in Fig. 1, but when the horse endeavors to run away the spring 11 is elongated bringing the entire pull of both wheels on the chain and preventing the rotation of each wheel. Another object of the spring is to enable the hooks to be separated the length of the slack chain in order that they may be removed from the fellies of the wheels readily, as would not be the case if the chain was only as long as the distance between the two wheels.

Having thus described my invention what I claim as new and desire to secure by Letters Patent of the United States, is as follows:—

1. In a chain grip, a pair of hooks curved and flattened to fit the fellies of a wheel; a chain secured to each hook; a spring secured to said chain and adapted to cause a number of links thereof to hang loosely when the spring is contracted, as set forth.

2. In a wheel grip, a pair of hooks curved and flattened to fit the fellies of a wheel; a soft pad in each of said hooks; a chain having the ends thereof secured to said hooks; and a spring secured to the links of said chain and adapted to cause a number of said links to hang loosely when said spring is contracted, as set forth.

In testimony whereof I have hereunto set my hand this 21st day of June A. D. 1910, in the presence of the two subscribed witnesses.

PETER J. STENSON.

Witnesses:
   A. K. DAGGETT,
   CARLOS P. GRIFFIN.